US012082326B2

(12) United States Patent
Devereaux et al.

(10) Patent No.: US 12,082,326 B2
(45) **Date of Patent: *Sep. 3, 2024**

(54) SYSTEMS AND METHODS FOR A PERCEIVED LINEAR DIMMING OF LIGHTS

(71) Applicant: Aclara Technologies LLC, St. Louis, MO (US)

(72) Inventors: Peggy Rose Devereaux, St. Louis, MO (US); Dennis Kelley, St. Peters, MO (US); Robert Walter Richardson, St. Charles, MO (US)

(73) Assignee: Aclara Technologies LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,964

(22) Filed: Apr. 28, 2023

(65) Prior Publication Data

US 2023/0262861 A1 Aug. 17, 2023

Related U.S. Application Data

(63) Continuation of application No. 17/713,888, filed on Apr. 5, 2022, now Pat. No. 11,751,313, which is a (Continued)

(51) Int. Cl.
*H05B 47/14* (2020.01)
*H05B 47/105* (2020.01)
*H05B 47/185* (2020.01)

(52) U.S. Cl.
CPC ........... *H05B 47/14* (2020.01); *H05B 47/185* (2020.01)

(58) Field of Classification Search
CPC ........ H05B 45/00; H05B 45/10; H05B 47/00; H05B 47/10; H05B 47/14; H05B 47/105; H05B 47/175; H05B 47/185
See application file for complete search history.

(56) References Cited

U.S. PATENT DOCUMENTS 8,339,062 B2 12/2012 Cencur
9,900,963 B1 * 2/2018 Doll ........................ H05B 45/10
(Continued)

FOREIGN PATENT DOCUMENTS

CN 102958255 A 3/2013
KR 20130040067 A 4/2013

OTHER PUBLICATIONS

Acuity Brands, eldoLED White Paper, "Why you need dimming curves," copyright 2016. (5 pages).
(Continued)

*Primary Examiner* — Thai Pham
(74) *Attorney, Agent, or Firm* — Robinson & Cole LLP

(57) ABSTRACT

A light dimming system includes one or more lights and includes a local light controller that includes a dimming controller and a processing circuit, the dimming controller configured to provide an output to the one or more light drivers. One or more electronic processors are configured to receive a dimming input value indicating a desired dimming level for the one or more lights. The processors are further configured to determine a configuration of the one or more light drivers, wherein the configuration defines whether the one or more light drivers utilize a non-linear dimming curve or a linear dimming curve, and provides the dimming controller a dimming level to output a dimming control signal to the one or more light drivers equivalent to the received dimming input value based on a non-linear or linear calculation.

20 Claims, 5 Drawing Sheets

Related U.S. Application Data continuation of application No. 17/237,625, filed on Apr. 22, 2021, now Pat. No. 11,324,096.

(60) Provisional application No. 63/013,848, filed on Apr. 22, 2020.

(56) References Cited

U.S. PATENT DOCUMENTS

| | | | | |
|---|---|---|---|---|
| 2004/0160199 | A1* | 8/2004 | Morgan .................. | G09G 3/14 315/312 |
| 2009/0184840 | A1 | 7/2009 | Veskovic et al. | |
| 2009/0273286 | A1 | 11/2009 | Veskovic et al. | |
| 2012/0206064 | A1* | 8/2012 | Archenhold ......... | H05B 45/385 315/297 |
| 2014/0125244 | A1 | 5/2014 | Nuhfer et al. | |
| 2015/0382421 | A1 | 12/2015 | Chowdhury et al. | |
| 2016/0036349 | A1* | 2/2016 | Steiner ................ | H05B 47/115 315/307 |
| 2017/0033598 | A1 | 2/2017 | Shen et al. | |

OTHER PUBLICATIONS

International Search Report and Written Opinion issued on Aug. 12, 2021, by the International Searching Authority in corresponding International Patent Application No. PCT/US21/28616. (14 pages).

* cited by examiner

SYSTEMS AND METHODS FOR A PERCEIVED LINEAR DIMMING OF LIGHTS

CROSS-REFERENCE TO RELATED APPLICATIONS

This application is a continuation of U.S. patent application Ser. No. 17/713,888, filed Apr. 5, 2022, which is a continuation of U.S. patent application Ser. No. 17/237,625, filed Apr. 22, 2021, now U.S. Pat. No. 11,324,096, issued on May 3, 2022, which claims priority to and the benefit of U.S. Provisional Patent Application No. 63/013,848, filed Apr. 22, 2020, the entire contents of which are hereby incorporated by reference in their entirety.

FIELD

The embodiments disclosed herein relate to lighting dimming controllers.

BACKGROUND

When dimming lights, such as streetlamps, work lights, etc., the dimming of the lights may not be perceived by a person to be dimming in a linear manner. For example, a user may set a dimming value to be 50% of a full output, but the user may not register a 50% reduction in the lighting output. This is often due to the response curve technology implemented in the components of the lighting system. Also, the human eye has a logarithmic reaction to protect itself from bright light, which affects how human eyes perceive dimming of lights in a non-linear fashion. In order to produce a dimming output that appears to be a linear response to the human eye, a combination of linear and logarithmic components are required to generate a linear response. However, in many systems, the lights and drivers may be from different manufacturers than the lighting and/or dimming controllers. This can make it difficult to determine what combination of components or settings are required to make the output appear linear to the human eye without trial and error. Thus, systems and methods for easily determining component configurations within the lighting system are desired.

SUMMARY

According to one aspect, a light dimming system is provided. The light dimming system includes one or more lights with each light having an associated light driver. The light dimming system further includes a local light controller that includes a dimming controller and a processing circuit, the dimming controller configured to provide an output to the one or more light drivers. The processing circuit of the local light controller includes one or more electronic processors that are configured to receive a dimming input value indicating a desired dimming level for the one or more lights. The processors are further configured to determine a configuration of the one or more light drivers, wherein the configuration defines whether the one or more light drivers utilize a non-linear dimming curve or a linear dimming curve. The processors are also configured to, in response to determining that the one or more light drivers utilize a linear dimming curve, configure the dimming controller to output a dimming signal to the one or more light drivers equivalent to the received dimming input value based on a non-linear dimming curve to cause the one or more lights to dim to a level perceived as equivalent to the received dimming input value.

According to another aspect, a method for controlling a dimming operation of a lighting device such that the dimming of the light appears to be linear to a human observer is provided. The method includes receiving, at a processing circuit of a local lighting controller configured to control a driver of the lighting device, a dimming input value representing a desired dimming level for the one or more lights. The method also includes determining, at the local lighting controller 104, a configuration of the one or more light drivers, wherein the configuration defines whether the driver of the lighting devices utilizes a non-linear dimming curve, or a linear dimming curve. The method also includes, in response to determining that the driver of the lighting device utilizes a linear dimming curve, configuring the dimming controller to output a dimming signal to the driver of the lighting device equivalent to the received dimming input value based on a non-linear dimming curve to cause the lighting device to dim to a level perceived as equivalent to the received dimming input value.

In yet another aspect, a lighting control system for determining a configuration of one or more lighting drivers is provided. The lighting control system includes one or more lights, each light configured to be driven by the one or more lighting drivers, and a local light controller that includes a dimming controller and a processing circuit. The dimming controller is configured to provide an output to the one or more light drivers. The lighting control system further includes a power meter. The processing circuit of the local light controller comprising one or more electronic processors that are configured to output a plurality of dimming values via the dimming controller. The processors are also configured to determine an instantaneous power value, via the power meter, at each of the plurality of dimming values, and store the instantaneous power value in a memory of the local lighting controller. The electronic processors are further configured to compare the difference between the instantaneous power readings at the associated dimming values, and determine, based on the instantaneous power values being linearly equivalent to each other at the associated dimming levels, that the one or more light drivers is configured to utilize a linear dimming curve. The electronic processors are further configured to determine, based on the difference of the instantaneous power values not being linearly equivalent to each other at the associated dimming levels, that the driver of the lighting device utilizes a non-linear dimming curve, and storing the determined configuration of the one or more light drivers in a memory of the local light controller.

Other aspects of the technology will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

As stated above, to ensure that the dimming of a light using a dimming system that actually appears to linearly dim to the human eye, it is necessary to have a controller that is opposite of the driver's dimming curve. If a driver has a non-linear dimming curve, then a linear controller is needed. An example of a non-linear dimming curve may include a logarithmic dimming curve. If a driver has a linear dimming curve, then a non-linear controller is needed. However, it can be difficult to know the configuration of some of the components in the system, and therefore how to ensure that the proper combination of components is present. The lights and their associated drivers may be from different manufacturers than the associated lighting controllers, therefore making it difficult for an integrator to ensure the proper combination of components. The technology disclosed herein describes systems and methods for automatically determining the configuration of a light driver and adapting a lighting control system to ensure the dimming characteristics of the lights appears linear to the human eye.

Figure 1:
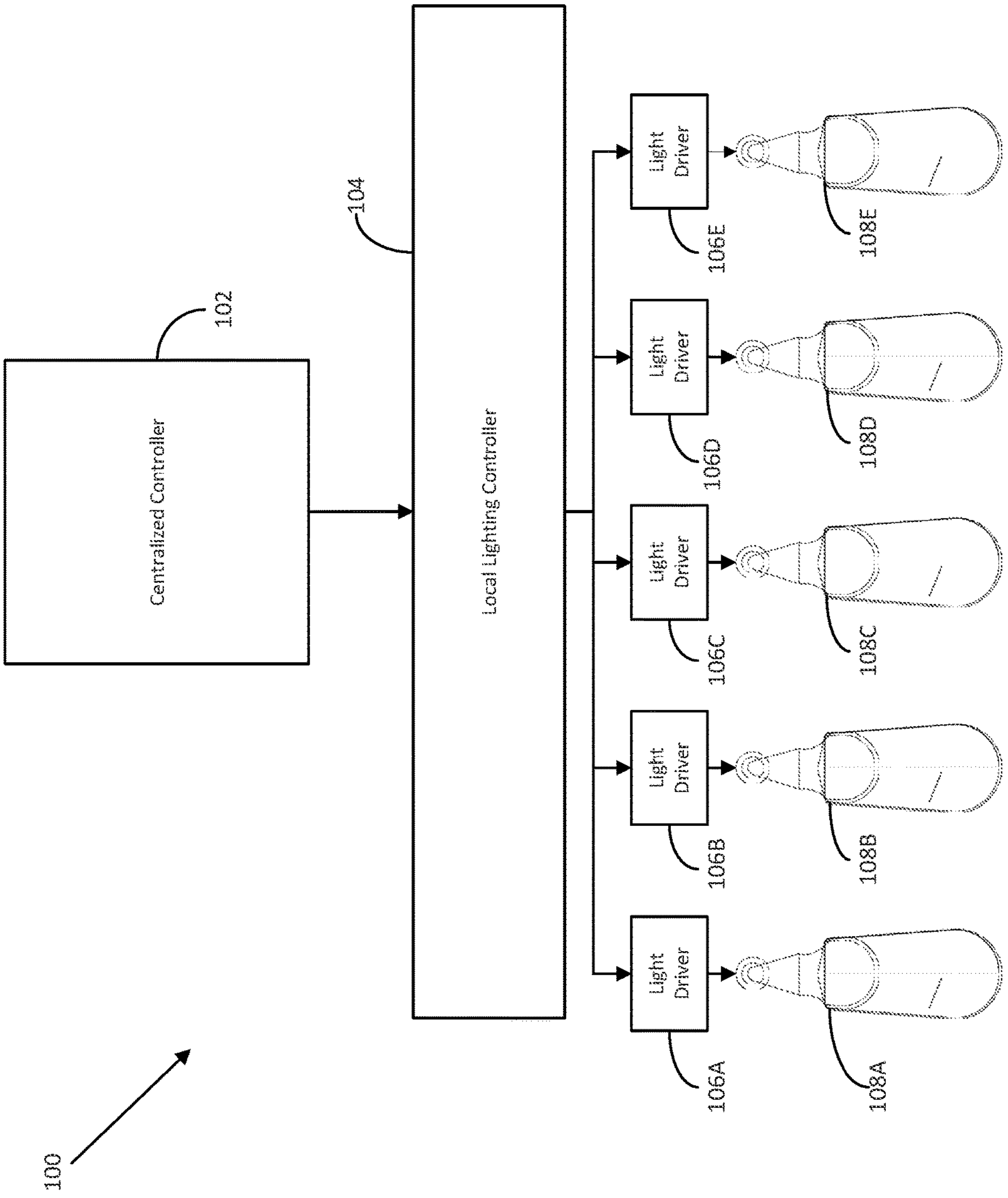
FIG. 1 is a system diagram illustrating a lighting control system, according to an exemplary embodiment.

FIG. 1 illustrates an example lighting control system 100, according to some embodiments. The lighting control system 100 includes a centralized lighting controller 102, a local lighting controller 104, and a number of light drivers 106A-E, each controlling a light 108A-E. In some embodiments, a single light driver may control multiple lights. For example, a single light driver may control all lights 108A-E. The centralized lighting controller 102 may be located remote from the local lighting controller 104. For example, the centralized lighting controller 102 may be located in a remote location, such as a remote server, a cloud based server, etc. In some embodiments, the functions of the centralized lighting controller 102 may be embedded within one or more software programs. Alternatively, the centralized lighting controller 102 may be accessed via different software programs and/or devices, such as via an application on a smartphone or tablet computer, via a web-based portal on a personal computer, a smartphone, a tablet computer, etc. In still further examples, the centralized lighting controller 102 may be a dedicated device.

In some embodiments, the centralized lighting controller 102 is in communication with the local lighting controller 104. The communication may be performed using different communication protocols, such as via internet (e.g. Ethernet connection), direct serial connections (RS-232, USB, USB-C, Firewire, etc.), power line communications (PLC), or wireless communication protocols (Wi-Fi, cellular (3G, 4G, 5G, LTE, CDMA, etc.) RF, Wi-Max. LoRa, and/or other wireless communication protocols).

The local lighting controller 104 may be a dedicated lighting controller, such as an Aclara Lighting Controller from Hubbell. In other examples, the lighting controller 104 is another type of dedicated lighting controller. Other lighting controller examples may be integrated with other devices, such as power meters, etc. The local lighting controller 104 is configured to provide an output signal to one or more light driver circuits, such as light drivers 106A-106E. For example, the local lighting controller 104 may be configured to output a voltage that corresponds to a desired light output level on the lights 108A-108E. In another example, the local lighting controller 104 may be configured to output a digital signal to one or more light driver circuits, such as light drivers 106A-106E. The digital signal may include a dimming level digital value that corresponds to a desired light output level on the lights 108A-108E.

The light drivers 106A-E may be integrated into the lights 108A-E to control the output of the lights 108A-E. In still further embodiments, the light drivers 106A-E may be configured to receive an input signal indicative of a dimming value, which may then be converted to an output for controlling the light output of the lights 108A-E. In some embodiments, the light drivers 106A-E may convert the received dimming value signal into a light output using a non-linear process. In other embodiments, the light drivers 106 may convert the received dimming value signal into a light output using a linear process. The lights 108A-E are shown as street lamps as would be seen in parking lots or roadside. However, it is contemplated that the lights 108A-E used with the system 100 can be any type of lights (LED, Incandescent, Fluorescent, arc lamps, mercury vapor lights, high pressure sodium lights, metal halide lights, induction lamps, ceramic discharge metal halide lamps, and the like).

Figure 2:
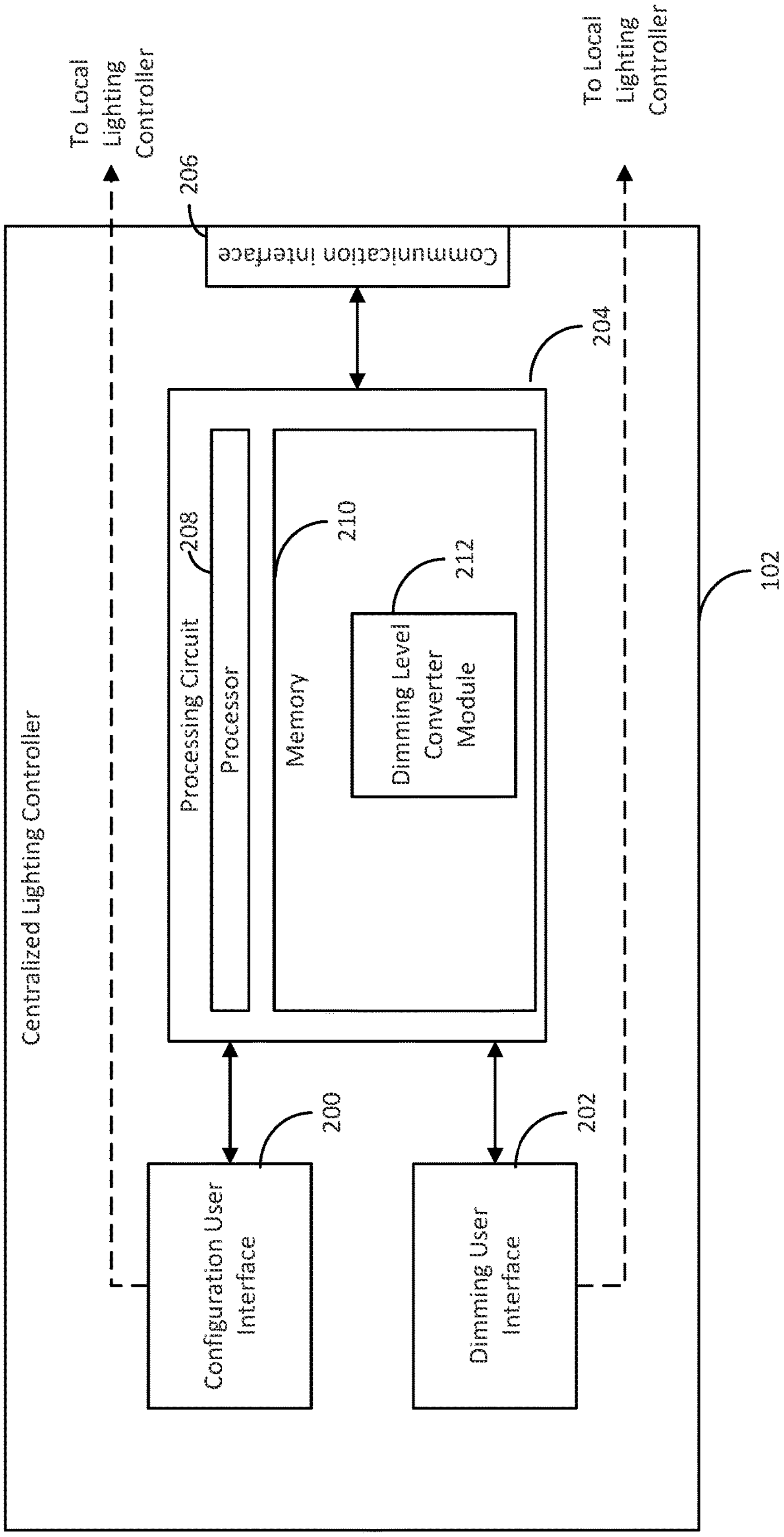
FIG. 2 is a block diagram illustrating an example central lighting controller, according to an exemplary embodiment.

Turning now to FIG. 2, a block diagram of a centralized lighting controller, such as centralized lighting controller 102 is shown, according to some embodiments. As illustrated in FIG. 2, the centralized lighting controller 102 may include one or more user interfaces, such as a configuration user interface 200 and a dimming user interface 202, and a processing circuit 204. The configuration user interface 200 and the dimming user interface 202 may be separate applications available to a user, in some embodiments. For example, the dimming user interface 202 may be available to users with permission to dim lights, such as lights 108A-E, described above. In contrast, the configuration user interface 200 may only be accessible by users who can make changes to the configuration of the centralized lighting controller 102 and/or the local lighting controller 104. In some embodiments, the configuration user interface 200 and or the dimming user interface 202 are accessed via a web-based interface, such as via a smartphone application, or a web-portal viewable from a computing device. However, in other embodiments, one or more dedicated user interfaces (e.g. LED/LCD displays, touch screens, monitors, computing terminal, etc.) may be used to access one or more of the configuration user interface 200 and/or the dimming user interface 202.

The processing circuit 204 may be communicably connected to one or more of the configuration user interface 200 and the dimming user interface 202. The processing circuit 204 may further be coupled to a communication module interface 206. The processing circuit 204 may include one or more electronic processors 208 and one or more memory devices 210. The electronic processors 208 may be implemented as a programmable microprocessor, an application specific integrated circuit (ASIC), one or more field programmable gate arrays (FPGA), a group of processing components, or with other suitable electronic processing components.

The memory devices 210 (for example, a non-transitory, computer-readable medium) includes one or more devices (for example, RAM, ROM, flash memory, hard disk storage, etc.) for storing data and/or computer code for completing or facilitating the various processes, layers, and modules described herein. The memory 210 may include database components, object code components, script components, or other types of code and information for supporting the various activities and information structure described in the present application. According to one example, the memory 210 is communicably connected to the electronic processor 208 via the processing circuit 204, and may include computer code for executing (for example, by the processing circuit 204 and/or the electronic processors 208) one or more processes described herein.

In one embodiment, the configuration user interface 200 allows the user to set a dimming control curve for the system. For example, the configuration user interface 200 may allow a user to select either a linear or a non-linear control curve when dimming one or more lights within the system. In some embodiments, selected control curve is stored in a memory, such as memory 210 of the processing circuit 204. In other embodiments, the selected control curve is provided to a local lighting controller, such as local lighting controller 104, and will be discussed in more detail below. The configuration user interface 200 may be a separate interface, in some examples. In one embodiment, the configuration user interface 200 is a software interface that is integrated with, and processed by, the processing circuit 204. The processing circuit 204 may be configured to provide the configuration user interface 200 to one or more users via one or more user interfaces, such as web-portals, dedicated monitors, software applications, or any other applicable user interface type which allows a user to both provide input and receive output from the user interface to utilize the configuration user interface 200. In still further embodiments, the configuration user interface 200 is configured to allow a user to select whether the light drivers 106A-E are linear or non-linear light drivers.

In some embodiments, the dimming user interface 202 allows a user to set a desired dimming level. In one preferred embodiment, the dimming user interface 202 is configured to allow a user to set a desired dimming level as a linearly perceived percentage. The desired dimming level may be stored in a memory, such as memory 210 of the processing circuit 204. The desired dimming level may also be output to a local lighting controller, such as local lighting controller 104, and will be discussed in more details below. In one embodiment, the dimming user interface 202 is a dedicated interface, separate from the processing circuit 204. In other embodiments, the dimming user interface 202 is a software interface that is integrated with, and processed by, the processing circuit 204. The processing circuit 204 may be configured to provide the dimming user interface 202 to one or more users via one or more user interfaces, such as web-portals, dedicated monitors, software applications, or any other applicable user interface type which allows a user to both provide input and receive output from the user interface to utilize the dimming user interface 202.

As described above, the memory 210 may include one or more processes, applications, etc., for execution via the processing circuit 204. As shown in FIG. 2, the memory 210 includes a central dimming level converter module 212. The central dimming level converter module 212 is configured to convert the desired dimming level percentage provided via the dimming user interface 202 to an appropriate linear or non-linear derived dimming level percentage. In some embodiments, the central dimming level converter module 212 converts the desired dimming level percentage based on one or more configuration parameters. In one embodiment the configuration parameters are provided via the configuration user interface 200. In other embodiments, the configuration parameters are provided by other devices, such as the local lighting controller 104, as will be described in more detail below.

Figure 3:
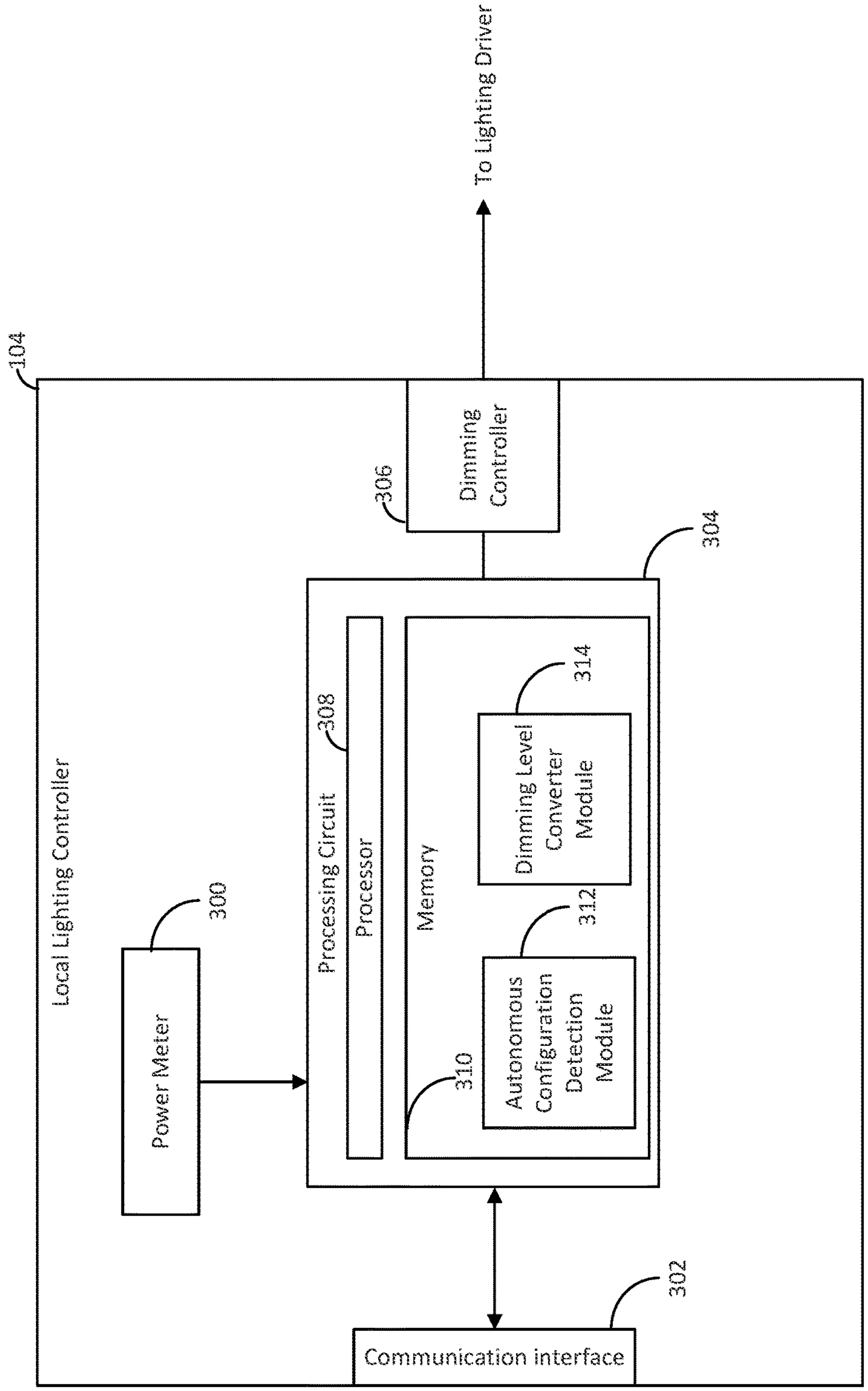
FIG. 3 is a block diagram illustrating a localized lighting controller, according to an exemplary embodiment.

Turning now to FIG. 3, a block diagram of a local lighting controller, such as local lighting controller 104 is shown, according to some embodiments. As illustrated in FIG. 3, the local lighting controller 104 may include a power meter 300, a communication interface 302, a processing circuit 304, and a dimming controller 306.

The power meter 300 is configured to measure one or more power parameters associated with devices coupled to the local lighting controller 104, such as lights 108A-E, as described above. For example, the power meter 300 may be configured to monitor power consumed by one or more of the lights 108A-E. In some embodiments, the power meter 300 is capable of determining the power consumption for each light 108A-E, individually. In other embodiments, the power meter 300 is configured to determine the power consumption for the group of lights 108A-E. In one embodiment, the power meter 300 is configured to determine an instantaneous power consumption of one or all of the lights 108A-E. The power meter 300 may be configured to monitor power parameters such as input voltage, output voltage, output current, power factor, etc. The power meter 300 may communicate measured and determined power parameters to the processing circuit 304.

The processing circuit 304 may be communicably connected to one or more of the power meter 300, the communication interface 302, and the dimming controller 306. The processing circuit 304 may include one or more processors 308, and one or more memory devices 310. The electronic processors 308 may be implemented as a programmable microprocessor, an application specific integrated circuit (ASIC), one or more field programmable gate arrays (FPGA), a group of processing components, or with other suitable electronic processing components.

The memory devices 310 (for example, a non-transitory, computer-readable medium) includes one or more devices (for example, RAM, ROM, flash memory, hard disk storage, etc.) for storing data and/or computer code for completing or facilitating the various processes, layers, and modules described herein. The memory 310 may include database components, object code components, script components, or other types of code and information for supporting the various activities and information structure described in the present application. According to some examples, the memory 310 is communicably connected to the electronic processor 308 via the processing circuit 304 and may include computer code for executing (for example, by the processing circuit 304 and/or the electronic processors 308) one or more processes described herein.

The communication interface 302 may be configured to communicate with one or more other devices, such as centralized lighting controller 102. The communication interface 302 may be configured to communicate using various protocols, such as via a wired Internet connection (e.g. Ethernet, Fiber Optic, Power Line Communications (PLC), etc.), direct serial connections (e.g. RS-232, USB, USB-C, Firewire, etc.), or wireless communications, such as cellular (3G, 4G, 5G, LTE, CDMA, etc.), Wi-Fi, Wi-Max, LoRa, ZigBee, Bluetooth, Bluetooth Low Energy (BLE), RF, Near Field Communication, etc.

As described above, the memory 310 may include one or more processes, applications, etc., for execution via the processing circuit 304 and/or the electronic processors 308. As shown in FIG. 3, the memory 310 includes an autonomous configuration detection module 312 and a local dimming level converter module 314. The autonomous configuration detection module 312 may be configured to autonomously derive the response of one or more of the light drivers 106A-E. Specifically, the autonomous configuration detection module 312 may be configured to determine whether one or more of the light drivers 106A-E drives the one or more lights 108A-E using a linear or a non-linear dimming curve.

The local dimming level converter module 314 is configured to convert the desired dimming level percentage provided via the dimming user interface 202 to an appropriate linear or non-linear derived dimming level output signal. In some embodiments, the local dimming level converter module 314 converts the desired dimming level percentage based on one or more configuration parameters. In one embodiment the configuration parameters are provided via the configuration user interface 200. In other embodiments, the configuration parameters are provided by other devices, such as the local lighting controller 104, as will be described in more detail below.

The dimming controller 306 is configured to control the level of light output by one or more of the lights 108A-E. The dimming controller 306 may output the desired level of light based on an input from one of the dimming level converter module 212 and/or the dimming level converter module 314. The dimming controller 306 may be used to output either a non-linear control curve or a linear control curve to one or more of the lighting drivers 106A-E, based on the input received from the dimming level converter modules 212 or 314 in order to effectuate a perceived linear dimming output from the lights 108A-E that corresponds to a selected user dimming percentage value. In one embodiment, the dimming controller 306 outputs an analog value to the one or more lighting drivers 106A-E, such as a 0-10 VDC signal which corresponds to a selected user dimming percentage value. However, other analog value types are also contemplated. In other embodiments, the dimming controller 306 outputs a digital value to the one or more lighting drivers 106A-E, which corresponds to a selected user dimming percentage value. In one embodiment, the dimming controller 306 is coupled to the one or more light drivers 106A-E for controlling the illumination output of the lights 108A-E.

Figure 4:
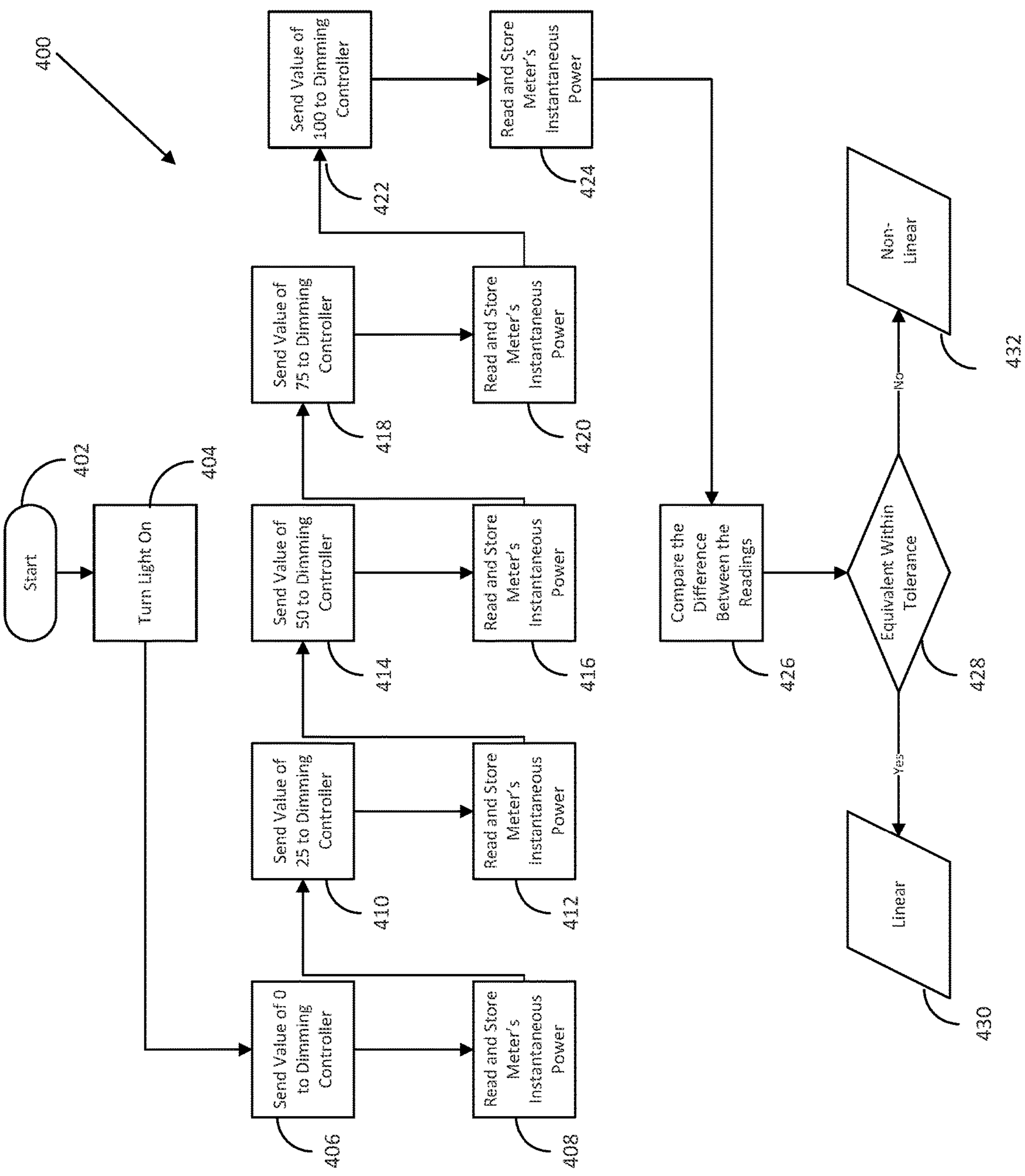
FIG. 4 is a flowchart illustrating a process for determining the configuration of a light driver, according to an exemplary embodiment.

Turning now to FIG. 4, a flowchart illustrates a process 400 for autonomously determining a configuration of a lighting driver, such as light drivers 106A-E. The process 400 may be performed by the autonomous configuration detection module 312 and the processing circuit 304. However, in other examples, the process 400 may be performed by other combinations of software modules and hardware described herein. Further, the values described below are for example purposes to describe the following embodiment, and other testing values are contemplated. The process starts at process block 402. At process block 404, one or more lighting devices, such as lights 108A-E, are turned on. As described above, a single light 108A-E may be turned on, or some or all of the lights 108A-E may be turned on, depending on the application. For purposes of the below descriptions, the dimming controller 306 operates as a linear dimming controller when the process 400 is being executed. However, it is contemplated that in other processes, the dimming controller 306 may operate as a non-linear dimming controller to execute the process.

At process block 406, a dimming request value representing a 0% output value (e.g. 0% of full output request) is output from the autonomous configuration detection module 312 to the dimming controller 306 to be provided to one or more of the lighting drivers 106A-E. At process block 408, the power meter 300 reads an instantaneous power consumption of one or more lights 108A-E and stores the instantaneous power in a memory, such as memory device 310. In alternative embodiments, data other than instantaneous power consumption, such as average power consumption, current draw, voltage drop, direct feedback from the lights, and the like may be provided to the power meter 300. In some embodiments, a delay is implemented between the output command being provided to the light drivers 106A-E and the instantaneous power being measured to provide an accurate instantaneous power rating. In one embodiment, the delay is two seconds. However, delays of more than two seconds or less than two seconds are also contemplated. It is understood that the above delay may be utilized before any instantaneous power level is measured after a change in an output from the dimming controller 306.

At process block 410, a dimming request value representing a 25% output value (e.g. 25% of full output request) is output from the autonomous configuration detection module 312 to the dimming controller 306 to be provided to one or more of the lighting drivers 106A-E. At process block 412, the power meter 300 reads an instantaneous power consumption of one or more lights 108A-E and stores the instantaneous power in a memory, such as memory device 310.

At process block 414, a dimming request value representing a 50% output value (e.g. 50% of full output request) is output from the autonomous configuration detection module 312 to the dimming controller 306 to be provided to one or more of the lighting drivers 106A-E. At process block 416, the power meter 300 reads an instantaneous power consumption of one or more lights 108A-E and stores the instantaneous power in a memory, such as memory device 310.

At process block 418, a dimming request value representing a 75% output value (e.g. 75% of full output request) is output from the autonomous configuration detection module 312 to the dimming controller 306 to be provided to one or more of the lighting drivers 106A-E. At process block 420, the power meter 300 reads an instantaneous power consumption of one or more lights 108A-E and stores the instantaneous power in a memory, such as memory device 310.

At process block 422, a dimming request value representing a 100% output value (e.g. full output request) is output from the autonomous configuration detection module 312 to the dimming controller 306 to be provided to one or more of the light drivers 106A-E. At process block 424, the power meter 300 reads an instantaneous power consumption of one or more lights 108A-E and stores the instantaneous power in a memory, such as memory device 310.

At process block 426, the difference between the readings are analyzed to determine whether the difference between the instantaneous power readings at each dimming level are equivalent to each other within a given tolerance across the associated dimming request values. In one embodiment, the autonomous configuration detection module 312 determines the difference between the instantaneous power readings at one or more of the associated dimming request values at the 0%, 25%, 50%, 75%, and 100% levels. At process block 428, the autonomous configuration detection module 312 determines if the differences are relatively equivalent, within tolerances, to indicate that the driver has a linear response/dimming curve. For example, the instantaneous power consumptions values at 0%, 25%, 50%, 75%, and 100% may be OW, 10 W, 20 W, 30 W, and 40 W, respectively. Thus, the difference in power consumption for each 25% delta of the dimming level is 10 W (+/−1 W thresholds), thereby indicating a linear response due to the power consumption deltas being equivalent throughout the dimming level ranges.

Based on determining that the differences are within the tolerances of a linear response, the autonomous configuration detection module 312 determines that the tested light driver of the light drivers 106A-E is a linear driver. As stated above, in the process 400, in response to determining that the tested light driver of the light drivers 106A-E is a linear driver, the dimming level converter module 314 or the dimming level converter module 212 will control the tested light driver with a non-linear output to achieve a perceived linear dimming experience. Based on determining that the differences are not within the tolerances of a linear response, the autonomous configuration detection module 312 determines that the tested light driver of the light drivers 106A-E is a non-linear driver and the dimming level converter module 314 or the dimming level converter module 212 will control the tested light driver with a linear output to achieve the perceived linear dimming experience. In one embodiment, the tolerance level is plus/minus 10%. However, values or more than 10% or less than 10% are also contemplated.

In some embodiments, the light drivers 106A-E are configured to have one or more deadband ranges at the lower dimming levels (e.g. 0%-25%) and/or at the upper dimming levels (e.g. 75%-100%). The autonomous configuration detection module 312 may detect these deadband ranges and configure the range of control to be 0 to 100% after the deadbands are removed. For example, if the energy consumption response to 0% and 25% dimming levels are near identical (e.g. similar power consumption for each value) on a linear driver, a deadband range is indicated. In response to a deadband being determined, the dimming level converter module 314 or the dimming level converter module 212 may be configured to adjust the available desired dimming level percentages to be between 25% and 100% of the associated light driver's 106A-E control range. In some embodiments, the light drivers 106A-E may be determined to not have a deadband ranges at the lower dimming level or upper dimming levels. The deadband ranges at the lower dimming level and/or upper dimming level may be dependent on the configuration of the associated lights 108A-E. For example, where the lights 108A-E are LED based, the type or brand of LEDs may determine whether one or more deadband ranges exist.

In one example, the autonomous configuration detection module 312 is configured to detect deadband ranges for the lower dimming levels and/or the upper dimming levels described above by measuring a power consumption of the light drivers 106A-E and/or lights 108A-E for given driving voltage ranges at one or more of the lower dimming levels and the upper dimming levels. For example, the power maybe monitored as the voltage output by the light drivers 106A-E is varied within a range from 0V to a higher voltage level where the power consumption of the light drivers 106A-E begins to change in order to detect whether a lower deadband range exists. In some examples, the power consumption of the light drivers 106A-E is measured between 0V and 1V; however, other output voltages are contemplated. In response to the power consumption not changing as the output voltage to the light drivers 106A-E is increased from 0V to 1V, a lower deadband is determined to exist by the autonomous configuration detection module 312. In response to the power consumption changing as the input voltage to the light drivers 106A-E is increased from 0V to 1V, a lower deadband is determined to not exist by the autonomous configuration detection module 312.

In one embodiment, the power consumption of the light drivers 106A-E is measured between the maximum voltage input and a lower input voltage output by the light drivers 106A-E to detect whether an upper deadband range exists. For example, the power consumption of the light drivers 106A-E is measured between output voltages of 9V and 10V. However, other voltage ranges are contemplated. In response to the power consumption not changing as the output voltage to the light drivers 106A-E is varied between 9V and 10V, an upper deadband is determined to exist by the autonomous configuration detection module 312. In response to the power consumption changing as the output voltage of the light drivers 106A-E is varied between 9V to 10V, an upper deadband range is determined to not exist by the autonomous configuration detection module 312. In one embodiment, the power meter 300 may measure the power consumption of the light drivers 106A-E.

As noted above, in response to a deadband range being determined, the dimming level converter module 314 or the dimming level converter module 212 may be configured to adjust the available desired dimming level output to be within a range of the associated light driver's 106A-E control range to account for the existence of an upper deadband range and/or a lower deadband range. Thus, for the example above having a lower deadband range between 0V-1V, the dimming level converter module 314 or the dimming level converter module 212 adjusts the available desired dimming level output to be within a range between 1V-10V. In another example, where an upper deadband range exists between 9V-10V, the dimming level converter module 314 or the dimming level converter module 212 adjusts the available desired dimming level output to be within a range between 0V-9V. Other dimming level output ranges may include 1V-9V, 0V-9V, etc.

Upon determining whether the light drivers 106A-E are linear or non-linear light drivers, the autonomous configuration detection module 312 communicates the determined light driver configuration to one or more of the central dimming level converter module 212 of the centralized lighting controller 102 and/or the local dimming level converter module 314 of the local lighting controller 104.

Figure 5:
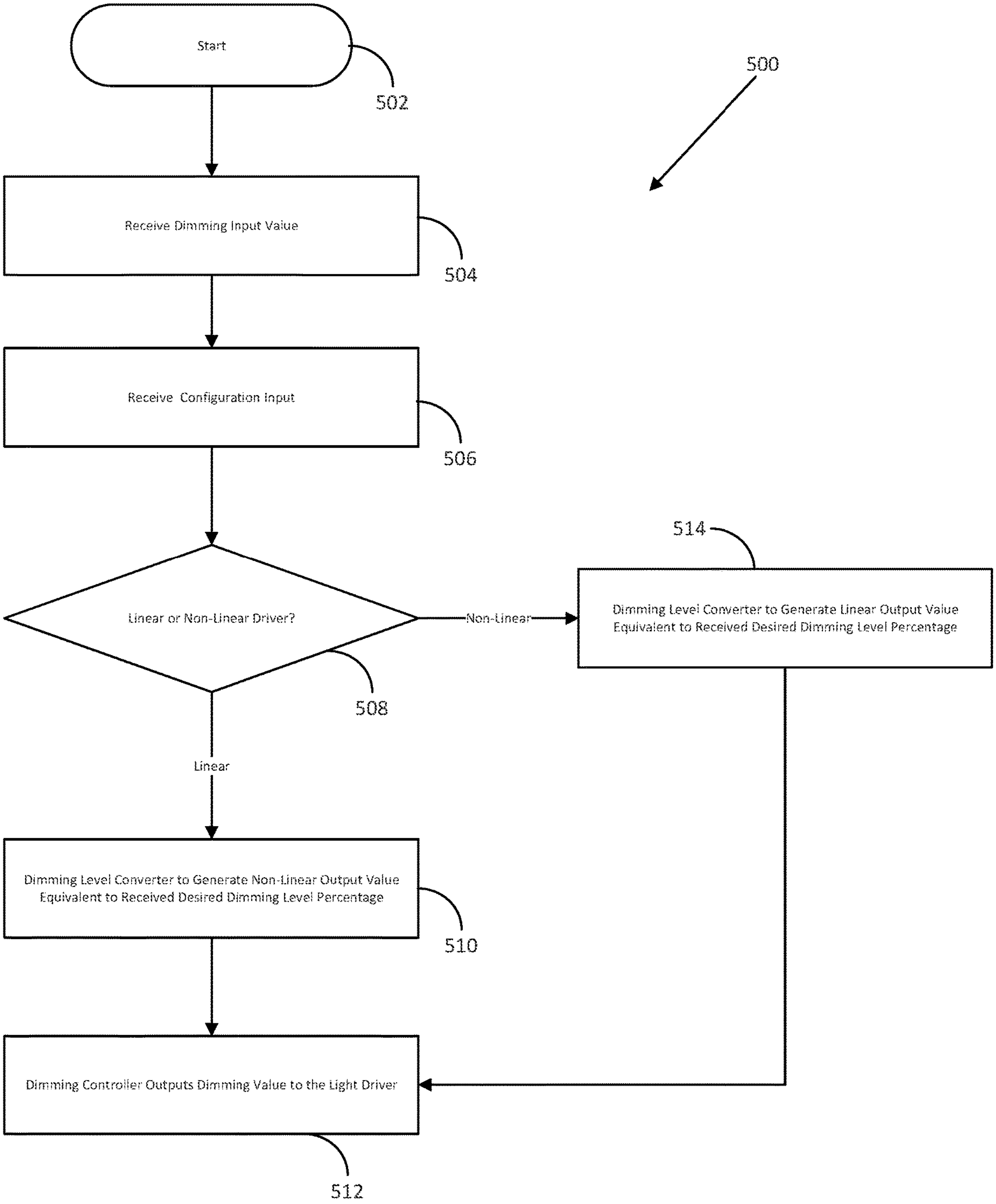
FIG. 5 is a flowchart illustrating a process for generating a control output to dim a light source to provide a linearly perceived dimming output, according to an exemplary embodiment.

Turning now to FIG. 5, a process 500 for controlling a dimming controller, such as dimming controller 306, to provide a perceived linear dimming output from one or more lights, such as lights 108A-E is shown, according to some embodiments. The process 500 starts at process block 502, and at process block 504, a desired dimming level percentage input value is received via the dimming user interface 202. In one embodiment, the desired dimming level percentage input value is received from the dimming user interface 202 by the processing circuit 204 of the centralized lighting controller 102. In other embodiments, the dimming input value is received from the dimming user interface 202 by the processing circuit 304 of the local lighting controller 104. The processing circuit 204 of the centralized lighting controller 102 may be configured to provide the received desired dimming level percentage input value to the central dimming level converter module 212. Similarly, the processing circuit 304 of the local lighting controller 104 may be configured to provide the received desired dimming level percentage input value to the local dimming level converter module 314.

At process block 506, configuration information is input to the dimming level controller module 314. The configuration information may include configuration regarding one or more components, such as the light drivers and/or the dimming controller 306. Example configuration data includes whether a lighting driver is linear or non-linear, whether a control signal output by the dimming controller 306 is to be linear or non-linear, and/or one or more calculation methods for determining a proper non-linear output signal. In one embodiment, the autonomous configuration detection module 312 automatically determines the light driver configuration, as described above, and provides the configuration to the local dimming level converter module 314.

In other embodiments, a user may manually input either the light driver configuration (e.g. whether the light drivers are linear or non-linear) or the needed controller configuration (e.g. whether the dimming controller 306 needs to output a linear or a non-linear control signal) using the configuration user interface 200. For example, a user may manually provide the light driver configuration type (e.g. linear or non-linear) via the configuration user interface 200. The light driver configuration type is then provided to the central dimming level converter module 212 or the local dimming level converter module 314, which can then convert the desired output signals as needed to achieve a perceived linear output. In another example, the user may directly instruct the central dimming level converter module 212 or the local dimming level converter module 314 to control the dimming controller 306 to output a linear output signal or a non-linear output signal based on the user knowing the light driver type using the configuration user interface 200. The configuration user interface 200 may then communicate either the driver configuration or the required controller configuration to the central dimming level converter module 212 of the processing circuit 204. In other embodiments, the configuration user interface 200 communicates the driver configuration or the needed controller configuration to the local dimming level converter module 314 of the processing circuit 304.

At process block 508, a decision is made as to whether the light drivers utilize linear or non-linear dimming curves to dim their associated lights. This determination may be performed by the central dimming level converter module 212 of the processing circuit 204 or the local dimming level converter module 314 of the processing circuit 304. Based on determining that the light drivers utilize a linear dimming curve, one of the central dimming level converter module 212 or the local dimming level converter module 314 generates a non-linear output value equal to the received desired dimming level percentage input value to the dimming controller 306 at process block 510. As described above, providing a non-linear dimming level to a driver which utilizes a linear dimming curve results in a perceived linear output at the light.

In some embodiments, the central dimming level converter module 212 or the local dimming level converter module 314 may access one or more references, such as look up tables to determine the proper non-linear value that corresponds to the desired linear dimming level provided by the user. In other embodiments, the central dimming level converter module 212 or the local dimming level converter module 314 performs one or more calculations or mathematical formulas to calculate the necessary non-linear value that corresponds to the desired dimming level provided by the user. In other embodiments, the central dimming level converter module 212 or the local dimming level converter module 314 may provide the proper non-linear value to the dimming controller 306. For example, the central dimming level converter module 212 or the local dimming level converter module 314 may access their respective memory to access one or more references, such as look up tables, to determine the proper non-linear value that corresponds to the desired linear dimming level provided by the user. Based on the output provided to the dimming controller 306, the dimming controller 306 then outputs the proper non-linear output level to the one or more light drivers 106A-E at process block 512.

Based on determining that the light drivers utilize a non-linear dimming curve, one of the central dimming level converter module 212 or the local dimming level converter module 314 generates a linear percentage power output value equal to the received dimming input value that is to be provided to the dimming controller 306 at process block 514. As described above, providing a linear control curve to a driver which utilizes a non-linear dimming curve results in a perceived linear output at the light. In one embodiment, the dimming controller 306 outputs a value equal to the received dimming input value. For example, where the received dimming input value was determined to be 50%, the dimming controller 306 will output a power to the light drivers 106A-E equivalent to 50%. Based on the output provided, the dimming controller 306 outputs the proper linear output level to the one or more light drivers 106A-E at process block 512.

While the process 500 is directed to providing the output level to the dimming controller, such as dimming controller 306, it is contemplated that in other examples, the process 500 may be applied to controlling the response type of one or more light drivers, such as light drivers 106A-E. For example, in lieu of modifying the dimming level to the dimming controller (e.g. linear or non-linear), the dimming controller may use a static dimming control curve (e.g. either linear or non-linear) and the response of the light drivers is modified instead in order to ensure the dimming output of an associated light is a linear dimming output as would be perceived by the human eye.

What is claimed is:

1. A local light controller comprising:

a dimming controller configured to provide an output to one or more light drivers associated with one or more lights; and a processing circuit of the local light controller comprising one or more electronic processors configured to:

receive a dimming input value indicating a desired dimming level for the one or more lights;

determine a configuration of the one or more light drivers, wherein the configuration defines whether the one or more light drivers utilize a non-linear dimming curve, or a linear dimming curve; and allow the dimming controller, in response to determining that the one or more light drivers utilize a non-linear dimming curve, to output a dimming signal to the one or more light drivers equivalent to the received dimming input based on a linear dimming curve to cause the one or more lights to dim to a level perceived as equivalent to the received dimming input value.

2. The local light controller of claim 1, wherein the processing circuit is further configured to:

allow the dimming controller, in response to determining that the one or more light drivers utilize a linear dimming curve, to output a dimming signal to the one or more light drivers equivalent to the received dimming input value based on a non-linear control signal to cause the one or more lights to dim to a level perceived as equivalent to the received dimming input value.

3. The local light controller of claim 1, wherein the processing circuit is configured to measure instantaneous power consumption of the one or more lights based on an input from a power meter.

4. The local light controller of claim 3, wherein determining the configuration of the one or more light drivers comprises:
- outputting, via the dimming controller, a plurality of dimming values;
- determining an instantaneous power value, via the power meter, at each of the plurality of dimming values to create a plurality of instantaneous power values;
- storing the instantaneous power values in a memory of the local light controller;
- comparing the difference between the instantaneous power value at the associated dimming level;
- determining, based on the instantaneous power values being linearly equivalent to one another at the associated dimming level, that the one or more light drivers utilize a linear dimming curve; and
- determining, based on the instantaneous power values not being linearly equivalent to one another at the associated dimming levels, that the one or more light drivers utilize a non-linear dimming curve.

5. The local light controller of claim 1, wherein the processing circuit is further configured to determine whether the one or more lights have a deadband range, wherein the deadband range comprises one or more of an upper deadband range and a lower deadband range.

6. The local light controller of claim 5, wherein the processing circuit is configured to determine a dimming output range of the one or more light drivers based on the determined deadband range.

7. The local light controller of claim 1 wherein the processing circuit is in communication with a communication interface configured to communicate with a remote light controller.

8. The local light controller of claim 7, wherein the processing circuit is further configured to receive the desired dimming level from the remote light controller through the communication interface.

9. A local light controller comprising:
- a dimming controller configured to provide an output to one or more light drivers associated with one or more lights; and
- a processing circuit of the local light controller comprising one or more electronic processors configured to:
  - receive a dimming input value indicating a desired dimming level for the one or more lights;
  - determine a configuration of the one or more light drivers, wherein the configuration defines whether the one or more light drivers utilize a non-linear dimming curve, or a linear dimming curve; and
  - allow the dimming controller, in response to determining that the one or more light drivers utilize a linear dimming curve, to output a dimming signal to the one or more light drivers equivalent to the received dimming input value based on a non-linear control signal to cause the one or more lights to dim to a level perceived as equivalent to the received dimming input value.

10. The local light controller of claim 9, wherein the processing circuit is configured to measure instantaneous power consumption of the one or more lights based on an input from a power meter.

11. The local light controller of claim 10, wherein determining the configuration of the one or more light drivers comprises:
- outputting, via the dimming controller, a plurality of dimming values;
- determining an instantaneous power value, via the power meter, at each of the plurality of dimming values to create a plurality of instantaneous power values;
- storing the instantaneous power values in a memory of the local light controller;
- comparing the difference between the instantaneous power value at the associated dimming level;
- determining, based on the instantaneous power values being linearly equivalent to one another at the associated dimming level, that the one or more light drivers utilize a linear dimming curve; and
- determining, based on the instantaneous power values not being linearly equivalent to one another at the associated dimming levels, that the one or more light drivers utilize a non-linear dimming curve.

12. The local light controller of claim 10, wherein the processing circuit is configured to communicate with a remote light controller through a communication interface.

13. The local light controller of claim 12, wherein the processing circuit is further configured to receive the desired dimming level from the remote light controller through the communication interface.

14. The local light controller of claim 9, wherein the processing circuit is further configured to determine whether the one or more lights have a deadband range, wherein the deadband range comprises one or more of an upper deadband range and a lower deadband range.

15. The local light controller of claim 14, wherein the processing circuit is configured to determine a dimming output range of the one or more light drivers based on the determined deadband range.

16. A local light controller comprising:
- a dimming controller and a processing circuit, the dimming controller configured to provide an output to a light driver;
- the processing circuit of the local light controller comprising one or more electronic processors configured to:
- output, via the dimming controller, a plurality of dimming values;
- determine an instantaneous power value, via an input from a power meter, at each of the plurality of dimming values to create a plurality of instantaneous power values;
- store the instantaneous power values in a memory of the local lighting controller;
- compare the difference between the instantaneous power values at the associated dimming values;
- determine, based on the difference of the instantaneous power values being linearly equivalent to each other at the associated dimming levels, that the light driver is configured to utilize a linear dimming curve;
- determine, based on the instantaneous power values not being linearly equivalent to each other at the associated dimming levels, that the light driver is configured to utilize a non-linear dimming curve; and store the determined configuration of the light driver in a memory of the local light controller.

17. The local light controller of claim 16, wherein the processing circuit is further configured to:

receive a dimming input value indicating a desired dimming level for a light coupled to the light driver; and allow dimming controller to output a dimming signal to the light driver to cause the light to dim to a level perceived as equivalent to the received dimming value input, based on the stored configuration of the light driver.

18. The local light controller of claim 17, wherein the dimming signal is based on a non-linear control curve.

19. The local light controller of claim 16, wherein the processing circuit is configured to receive an input from a remote lighting controller having a user interface configured to receive user input indicating the desired dimming level.

20. The local light controller of claim 16, wherein the light driver comprises one or more deadband ranges, wherein the deadband ranges comprise a first deadband value at a lower dimming level range, and a second deadband value at an upper dimming range.

* * * * *